United States Patent [19]

Hori et al.

[11] Patent Number: 4,460,325
[45] Date of Patent: Jul. 17, 1984

[54] METAL MOLD FOR VULCANIZATION OF REINFORCED HOSE

[75] Inventors: Yoshimi Hori; Takashi Ishida, both of Gifu; Keizo Hayashi, Nagoya, all of Japan

[73] Assignee: Toyoda Gosei Co., Ltd., Nishikasugai, Japan

[21] Appl. No.: 452,863

[22] Filed: Dec. 23, 1982

[30] Foreign Application Priority Data

Dec. 23, 1981 [JP] Japan .................... 56-208464

[51] Int. Cl.³ .................................. B29H 7/14
[52] U.S. Cl. ......................... 425/393; 264/276; 264/320; 425/392; 425/DIG. 5
[58] Field of Search .............. 425/392, 393, 450.1, 425/500, 501, 517, 519, 520, 320, 806, DIG. 5, 340, 330; 249/161, 162; 264/257, 334, 248, 276, 347

[56] References Cited

U.S. PATENT DOCUMENTS 1,386,003  8/1921  Kempton ............... 425/393
1,417,743  5/1922  Kempton ............... 425/330
2,622,657 12/1952  Klaue .................. 264/257

FOREIGN PATENT DOCUMENTS 1159161  6/1964  Fed. Rep. of Germany .
49-45182  4/1974  Japan .
56-19818  5/1981  Japan .

Primary Examiner—James B. Lowe
Assistant Examiner—Tinker R. McBrayer
Attorney, Agent, or Firm—Cushman, Darby & Cushman

[57] ABSTRACT

This invention concerns a metal mold for the manufacture of a vulcanized reinforced hose by the compression and vulcanization of an unvulcanized hose in the cavity of the metal mold. This metal mold comprises a movable piece, a stationary piece, and a pair of inner pieces disposed between the movable piece and the stationary piece. The movable piece, the stationary piece, and the pair of inner pieces are severally provided at the inner sides thereof with depressions corresponding to the four equal parts into which the inner surface of the cavity of the metal mold is radially divided so that when the metal mold is closed, the pair of inner pieces are synchronously moved with the movable piece and the stationary piece in the direction of compressing the unvulcanized hose.

7 Claims, 5 Drawing Figures

METAL MOLD FOR VULCANIZATION OF REINFORCED HOSE

BACKGROUND OF THE INVENTION

1. Field of the Invention

This invention relates to a metal mold suitable for vulcanization under pressure of a rubber hose incorporating a reinforcing layer (reinforced hose).

2. Description of the Prior Art

It has been heretofore held that in the vulcanization of a reinforced hose, the measure of compressing with high pressure an inner and an outer rubber layer toward each other across an interposed reinforcing layer formed of reinforcing fibers, thereby improving intimate mutual adhesion of the component layers, is effective for the purpose of enabling the reinforced hose to acquire improved pressure resistance and durability.

Subsequently to this procedure, there has been adopted either a wrapping process which involves wrapping a cloth around the outer surface of an extruded hose and subjecting the wrapped hose to vulcanization in a compressed state or a lead covering process which comprises coating the outer tube of the hose with fluid lead immediately after extrusion of the hose and subjecting the lead-covered hose to vulcanization in a compressed state. The wrapping process is deficient in productivity and possibly produces a hose suffering from heavy dispersion of size. The lead covering process has a disadvantage that the cost of equipment is high and the work environment is seriously impaired by lead.

To cope with this adverse situation, there has been devised a method which permits easy production of a reinforced hose as shown in FIG. 2 by compressing as in FIG. 1 toward the outer surface of a mandrel 6 a vulcanized hose 7 formed sequentially of an inner rubber layer 7a, a reinforcing layer 7c, and an outer rubber layer 7b. As in FIG. 1 this apparatus requires use of a metal mold 1 adapted to be halved into a movable piece 2 and a stationary piece 3 and thereafter subjecting the hose to vulcanization.

In order for the intimate mutual adhesion of the reinforcing layer and the inner and outer rubber layers to be improved by compressing and vulcanizing the unvulcanized hose with such a two-piece metal mold as described above, it becomes necessary to give to the inner cavity of the metal mold an inside diameter smaller than the outside diameter of the unvulcanized hose. Further, during the compression of the unvulcanized hose, the outer rubber layer 7b moves in the two directions along the split plane of the metal mold possibly to cause deformation in the reinforcing fibers which form the reinforcing layer. The product of this method, therefore, entails a disadvantage that it is deficient in terms of strength.

SUMMARY OF THE INVENTION

An object of this invention is to provide a metal mold for the vulcanization of a reinforced hose, capable of decreasing the dispersion of the size of the reinforced hoses produced after the vulcanization and, at the same time, curbing deformation of neat rows of reinforcing fibers forming the reinforcing layer even when the magnitude of compression is large during the compression of the component layers of the unvulcanized hose, and preventing otherwise possible loss of strength.

To be specific, this invention is directed to a metal die for the manufacture of a reinforced hose by the compression and vulcanized of an unvulcanized hose within the cavity of the metal die. This metal die comprises a movable piece, a stationary piece, and a pair of inner pieces disposed between the movable piece and the stationary piece. It is characterized by the fact that the movable piece, the stationary piece, and the pair of inner pieces are severally provided at the inner sides thereof with depressions corresponding to the four equal parts into which the inner surface of the cavity of the metal mold is radially divided so that when the metal mold is closed, the pair of inner pieces are synchronously moved with the movable piece and the stationary piece in the direction of compressing the unvulcanized hose.

DESCRIPTION OF THE PREFERRED EMBODIMENT

Figure 1:
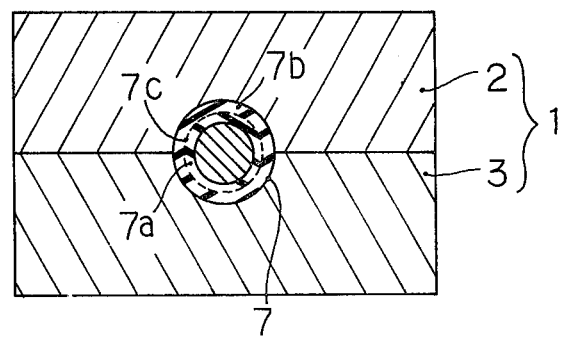
FIG. 1 is a sectional view illustrating an unvulcanized hose being compressed and vulcanized in a two-piece metal mold.
Figure 2:
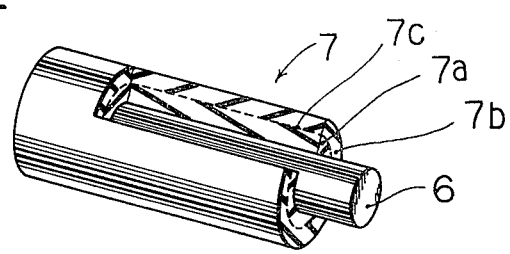
FIG. 2 is a partially cutaway perspective view illustrating the unvulcanized hose.

Now, the present invention will be described in detail below with respect to a preferred embodiment thereof.

A movable piece 12 and a stationary piece 13 fastened respectively to a movable heater plate 18 and a stationary heater plate 19 are provided respectively with depressions 12a and 13a which are adapted to participate in the formation of the inner surface of the cavity of the metal mold, correspond each to about one fourth of the outer surface of a produced reinforced hose, and serve to compress the unvulcanized hose 17.

The movable piece 12 is provided on the opposite sides of the depression 12a thereof with sliding grooves 12b, 12b'. On the outer sides of the sliding grooves 12b, 12b', there are formed inclined surfaces 12c, 12c' each having 45° as the angle "α" (shown in FIG. 4) relative to the direction in which the movable piece 12 is opened and closed (in the vertical direction in the diagram).

Similarly, the stationary piece 13 is provided on the opposite sides thereof with sliding grooves 13b, 13b'. On the outer sides of the sliding grooves 13b, 13b', there are formed inclined surfaces 13c, 13c' each having 45° as the angle "α" (shown in FIG. 4) relative to the direction in which the movable piece 12 is opened and closed. The sliding grooves 13b, 13b' of the stationary piece are further provided respectively with holes 13d, 13d' which are each provided with a spring 21 serving to energize inner pieces 14, 15 (to be described more fully afterward). Those holes slant upwardly toward the outside and a guide pin 20 is provided in each so as to be parallel to the inclined surfaces 13c, 13c' and are inserted into the inner pieces 14, 15 so as to ensure smooth slide of the inner pieces 14, 15.

The inner pieces 14, 15 are provided respectively with depressions 14a, 15a which are adapted to participate in the formation of the inner surface of the cavity of the metal mold, correspond each to about one fourth of the outer surface of a produced reinforced hole, and serve to compress the unvulcanized hose 17. These inner pieces are attached to the stationary piece 13 as opposed to each other by the medium of guide pins 20.

The upper sliding surfaces 14b, 15b disposed respectively on the outer upper sides of the inner pieces 14, 15 are adapted to slide in contact with the inclined surfaces 12c, 12c' of the movable piece respectively. The lower sliding surfaces 14c, 15c disposed respectively on the outer lower sides of the inner pieces 14, 15 are adapted to slide on the inclined surfaces 13c, 13c' of the stationary piece. Denoted by 14d, 15d are escape grooves for releasing excess rubber during the compression of the unvulcanized rubber.

Now, the condition in which the unvulcanized hose 17 is vulcanized in the metal mold 11 will be described below.

Figure 3:
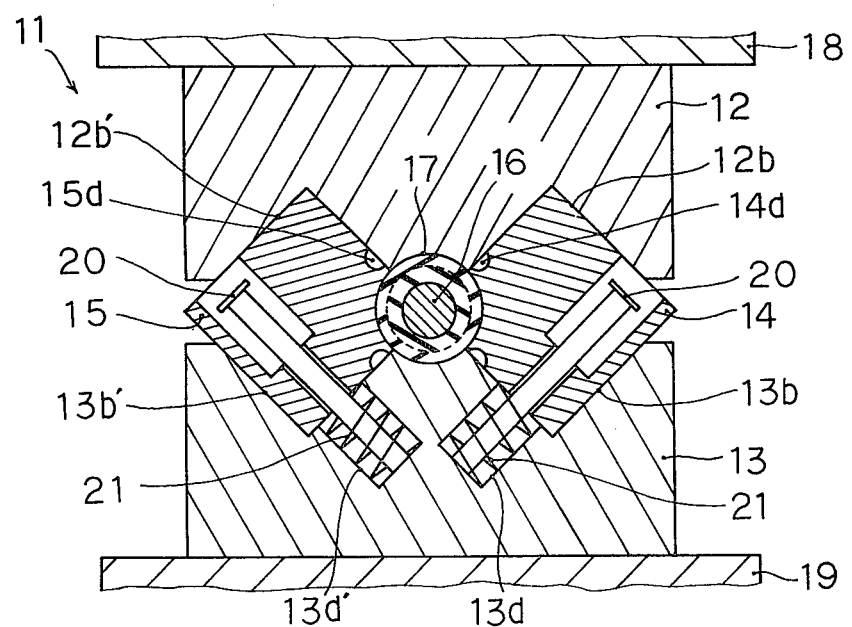
FIG. 3 is a sectional view illustrating a metal mold which embodies the present invention.
Figure 4:
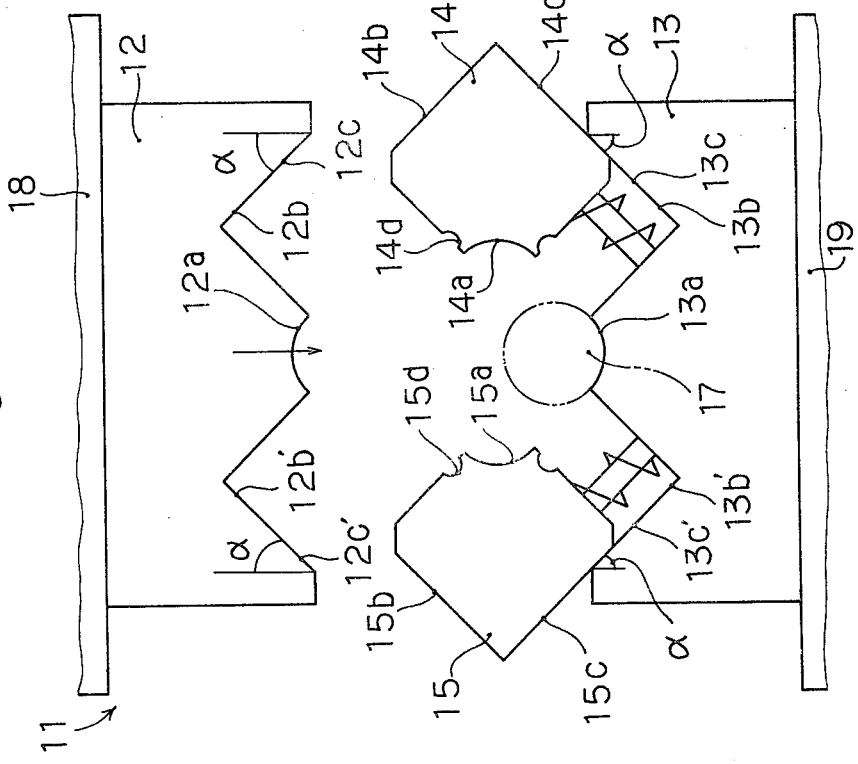
FIG. 4 is a front view illustrating the metal mold embodying this invention in a state ready to be closed.

First, the unvulcanized hose 17 sequentially consisting of an inner rubber layer, a reinforcing layer, and an outer rubber layer and wrapped around the mandrel 16 as illustrated in FIG. 3 is set in position on the depression 13a of the stationary piece (shown in FIG. 4). In this time, the inner pieces 14, 15 are kept by the energizing force of the springs 21 on the inclined surfaces 13c, 13c' near the outer sides thereof. These are the positions at which the heads of the guide pins 20 restrict the movement of the inner pieces 14, 15.

Figure 5:
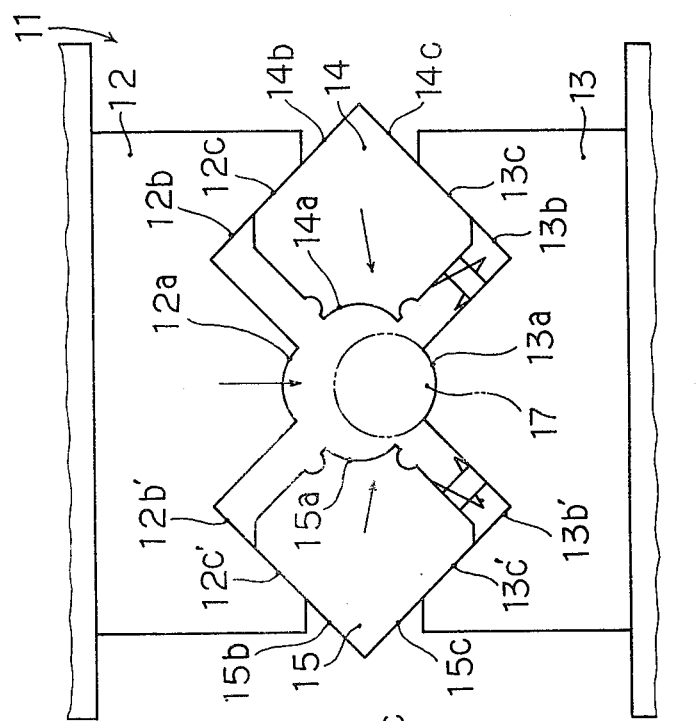
FIG. 5 is a front view illustrating the metal mold embodying this invention in a process of being closed from the state of FIG. 4.

Then, the movable heater plate 18 and the movable piece 12 are moved downwardly with respect to the position illustrated in the direction of closing the metal mold. Consequently, the upper sliding surfaces 14b, 15b of the inner pieces 14, 15 collide respectively with the inclined surfaces 12c, 12c' of the sliding grooves formed on the movable piece. As the movable piece 12 is further moved downwardly, the inner pieces 14, 15 have the upper sliding surfaces 14b, 15b thereof slid on the inclined surfaces 12c, 12c' of the movable piece and the lower sliding surfaces 14c, 15c thereof slid on the inclined surfaces 13c, 13c' of the stationary piece respectively, with the depressions 14a, 15a thereof brought closer to the unvulcanized hose 17 (as shown in FIG. 5). At this time, since the inclined surfaces 12c, 12c', 13c, and 13c' are formed each at an angle of 45° relative to the direction in which the movable piece 12 is opened and closed, the speeds at which the movable piece 12 and the inner pieces 14, 15 approach the unvulcanized hose 17 are identical.

As the movable piece 12 is further moved downwardly in the diagram to close the metal mold (as shown in FIG. 3), the depressions 12a, 14a, 15a, and 13a of the movable piece, the inner pieces, and the stationary piece simultaneously compress the unvulcanized hose 17 in the four directions, with the result that the reinforcing layer and the inner and outer rubber layers of the unvulcanized hose 17 are intimately joined to one another. The excess rubber, if any, moves toward the escape grooves 14d, 15d formed in the four directions in the split faces of the metal mold 11. If, in this case, the extent to which the unvulcanized hose 17 is compressed is increased and the total volume of excess rubber allowed to depart from the outer rubber layer and escape along the split faces of the metal mold is equal to that involved in the conventional two-piece metal mold, since the metal mold 11 of the present embodiment is split into four pieces, the volume of excess rubber allowed to escape along each of the split faces is smaller in the metal mold of the present embodiment than in the conventional metal mold. Consequently, the deformation of neat rows of reinforcing fibers forming the reinforcing layer is curbed and the loss of strength of the reinforced hose is prevented more effectively in the former metal mold than in the latter metal mold.

Further the fact that the volume of excess rubber allowed to escape along each of the split faces is smaller in the four-piece metal mold than in the two-piece metal mold implies that the allowance for compression of the unvulcanized hose is greater in the four-piece metal mold than in the two-piece metal mold and that, when the outside diameter of the unvulcanized hose is heavily dispersed, the two-piece metal mold fails to absorb the error and gives products of fixed strength and size and the four-piece metal mold, by contrast, fully absorbs the error and gives products of fixed strength and size.

Since the two-piece metal mold effects compression in two directions, it becomes difficult for this metal mold to give required compression equally to the entire outer surface of the unvulcanized hose as the outside diameter of the reinforced hose is increased. The four-piece metal mold, however, effects compression in four directions. It, therefore, gives required compression equally to the entire outer surface of the unvulcanized hose more easily than the two-piece metal mold. It permits reinforced hoses to be produced invariably even in increased outside diameters.

When the inclined faces of the sliding grooves in the movable piece and the stationary piece form an angle of 45° relative to the direction in which the movable piece is opened and closed as in the present embodiment, the unvulcanized hose is compressed with one fixed pressure all at once in four directions to cause powerful, uniform mutual adhesion of the component layers of the unvulcanized hose. Thus, the metal mold of the present embodiment permits reinforced hoses to be produced with high quality.

The unvulcanized hose 17, as held in a state compressed simultaneously by the movable piece 12, the inner pieces 14, 15, and the stationary piece 13, is allowed to undergo vulcanization until completion.

Thereafter, the movable piece 12 is moved upwardly in the diagram in the direction of opening the metal mold and the inner pieces 14, 15 are moved aslant upwardly in the outward directions by the energizing force of the springs 21 to permit removal of the vulcanized reinforced hose. The reinforced hoses produced after the vulcanization show no noticeable dispersion of product size because the compression and vulcanization of the unvulcanized hose are both performed by the use of the metal mold, the metal mold so used is of a four-piece type, and the metal mold therefore has a large allowance for compression of the unvulcanized hose enough to dispersion, if any, in the outside diameter of the unvulcanized hose.

The present invention is not restricted by the foregoing description of preferred embodiment and the illustration by the drawings but may be modified or altered without departing from the technical idea of the present invention.

What is claimed is:

1. A metal mold for the manufacture of a reinforced hose by the compression and vulcanization of an unvulcanized hose within the cavity of said metal mold, which metal mold comprises:

a movable piece, a stationary piece, and a pair of inner pieces disposed between said movable and stationary pieces, said movable piece, each of said stationary piece and said pair of inner pieces being provided at the inner sides thereof with depressions corresponding to four equal parts into which the inner surface of said cavity of said metal mold is radially divided, said movable piece and stationary piece being provided with sliding grooves which guide said pair of inner pieces to opposite sides of said depressions to form said cavity and having inclined surfaces each forming an angle of 45° relative to the direction in which the movable piece is opened and closed, said pair of inner pieces being disposed in contact with said inclined surfaces at least when said inner pieces are in the process of closing said metal mold so that when said metal mold is closed, said pair of inner pieces are synchronously moved art relatively the same speeds with said movable piece and said stationary piece in the direction of compressing said unvulcanized hose and said pair of inner pieces, said movable piece and said stationary piece compress said unvulcanized hose in four directions at the same pressure.

2. A multi-part metal mold for compressing and vulcanizing an unvulcanized reinforced hose in an interior cavity, said mold comprising first, second and third movable members, and a stationary member, said second and third movable members being movable to positions within substantially comparably shaped confines provided within said first movable member and said stationary member, said second and third movable members each having a substantially square cross-sectional shape, each of said first, second and third movable, members and said stationary member having an interior portion for defining at least part of the interior mold cavity, and said second and third movable members being reciprocally biased mounted to said stationary member.

3. A multi-part metal mold as in claim 2, wherein each of said second and third movable members is mounted about a retaining guide pin and spring means are provided therearound between said stationary member and each of said second and third movable members.

4. A multi-part metal mold as in claim 3, wherein each of said second and third movable members have a pair of internal surfaces and wherein a plurality of escape grooves are provided on said internal surfaces.

5. A multi-part metal mold as in claim 3, wherein each escape groove is at a right angle to each other adjacent groove.

6. A multi-part metal mold as in claim 2, wherein each of said interior portions comprise substantially the same area of the interior metal cavity.

7. A multi-part metal mold as in claim 3, wherein each of said second and third movable members is urged in an outward direction from said stationary member by said spring means to permit removal of a vulcanized reinforced hose.

* * * * *